United States Patent
King

(10) Patent No.: US 10,723,260 B2
(45) Date of Patent: Jul. 28, 2020

(54) AUTONOMOUS VEHICLE INFORMATION LIGHTING SYSTEM

(71) Applicant: VALEO NORTH AMERICA, INC., Troy, MI (US)

(72) Inventor: Robert King, Seymour, IN (US)

(73) Assignee: Valeo North America, Inc., Troy, MI (US)

(*) Notice: Subject to any disclaimer, the term of this patent is extended or adjusted under 35 U.S.C. 154(b) by 0 days.

(21) Appl. No.: 16/141,261

(22) Filed: Sep. 25, 2018

(65) Prior Publication Data

US 2020/0094734 A1 Mar. 26, 2020

(51) Int. Cl.
| | | |
|---|---|---|
| B60Q 1/50 | (2006.01) | |
| B60Q 1/28 | (2006.01) | |
| B60Q 1/30 | (2006.01) | |
| B60Q 1/44 | (2006.01) | |
| B60Q 1/26 | (2006.01) | |
| B60Q 1/34 | (2006.01) | |
| G05D 1/02 | (2020.01) | |

(52) U.S. Cl.
CPC ............ *B60Q 1/50* (2013.01); *B60Q 1/2607* (2013.01); *B60Q 1/28* (2013.01); *B60Q 1/30* (2013.01); *B60Q 1/346* (2013.01); *B60Q 1/44* (2013.01); *G05D 1/0287* (2013.01)

(58) Field of Classification Search
CPC .......... B60Q 1/50; B60Q 1/2607; B60Q 1/28; B60Q 1/30; B60Q 1/346; B60Q 1/44; G05D 1/0287
See application file for complete search history.

(56) References Cited

U.S. PATENT DOCUMENTS

| | | | |
|---|---|---|---|
| 9,953,538 B1* | 4/2018 | Matthiesen | G08G 1/166 |
| 2005/0195137 A1* | 9/2005 | Richards | G02B 26/008 345/84 |
| 2006/0139184 A1* | 6/2006 | Hong | G01O 21/3626 340/995.1 |
| 2006/0238368 A1* | 10/2006 | Pederson | B60Q 1/2611 340/815.45 |
| 2009/1745401 | 7/2009 | Smith | |
| 2009/0219150 A1* | 9/2009 | DeYoung | B60Q 1/46 340/471 |
| 2014/0214260 A1* | 7/2014 | Eckert | B60Q 1/488 701/28 |
| 2018/0304801 A1* | 10/2018 | Salter | B60Q 1/0035 |

* cited by examiner

*Primary Examiner* — Omeed Alizada
(74) *Attorney, Agent, or Firm* — Valeo North America, Inc.

(57) ABSTRACT

A vehicle lighting system, a system, and method for an autonomous vehicle are provided. The vehicle lighting system includes a light module and a controller. The controller is configured to control a behavior of the light module to communicate an operating status of an autonomous vehicle.

14 Claims, 5 Drawing Sheets

400

| Vehicle condition | Variable Intensity | Variable Size | Variable Flash Rate |
|---|---|---|---|
| Initial Autonomous | Low Intensity green | Partial Light Green | Slow Flash Green Partial Light |
| Taking off Autonomous | Green | Green | Fast Flash Green |
| Driving Autonomous | Low Intensity Green Partial Light | Partial Light Green | Partial Light Green |
| Turn Autonomous Far away | Low Intensity Orange Slow Flash | Partial Light Orange Slow Flash | Variable Flash Rate |
| Turn Autonomous Close | Slow Flash Orange | Slow Flash Orange | Fast Flash Orange |
| Stop Autonomous Far away | Low Intensity Red | Partial Light Red | Variable Flash Rate |
| Stop Autonomous Close | Red | Red | Red |
| Stop Autonomous Vehicle too close | Fast Flash Red | Fast Flash Red | Fast Flash Red |

FIG. 4

AUTONOMOUS VEHICLE INFORMATION LIGHTING SYSTEM

BACKGROUND

Motor vehicles contain numerous lighting devices for both interior and exterior illumination. For example, exterior vehicle lighting devices may perform stop lamp functions, tail lamp functions, headlamp functions, daytime running light functions, dynamic bending light functions, and fog lamp functions. These lamps are used to provide a message to surrounding vehicles and pedestrians. For example, these lamps provide an indication of the presence of the vehicle during limited visibility, and they provide a warning of an impending action by the vehicle. Activation of these lamps is usually via a manual activation.

Autonomous driving systems such as self-driving or highly automated vehicles are designed to operate a vehicle on roads without driver interaction or external control. As autonomous vehicle become more common, it may be necessary to provide a status of the autonomous vehicle to other drivers and pedestrians.

The "background" description provided herein is for the purpose of generally presenting the context of the disclosure. Work of the presently named inventors, to the extent it is described in this background section, as well as aspects of the description which may not otherwise qualify as conventional art at the time of filing, are neither expressly nor impliedly admitted as conventional art against the present disclosure.

SUMMARY

Embodiments described herein include the following aspects.

The present disclosure relates to a vehicle lighting system that includes a light module and a controller. The controller is configured to control a behavior of the light module to communicate an operating status of an autonomous vehicle.

In one aspect, the controller is further configured to determine the operating status of the autonomous vehicle; identify the behavior of the light module associated with the operating status; and control the behavior of the light module based on the identified behavior.

In one aspect, the behavior includes one or more of a color, an intensity, and a pattern of illumination.

In one aspect, the vehicle lighting system includes a sensor configured to determine the operating status of the autonomous vehicle.

In one aspect, the sensor includes a global positioning system.

In one aspect, the sensor includes a camera.

In one aspect, the behavior of the light module includes static conditions and/or dynamic conditions.

In one aspect, the static conditions include intensity, color, and size of the illumination.

In one aspect, the dynamic conditions include at least a flash rate.

In one aspect, the behavior is identified based on a user input.

In one aspect, the behavior of the light module is based on a regulatory standard.

In one aspect, a first illuminating characteristic and a second illuminating characteristic are associated with the operating status of the autonomous vehicle, a selection between the first illuminating characteristic and the second illuminating characteristic being based on a proximity of an event and/or a proximity of another vehicle to the autonomous vehicle.

In one aspect, the first illuminating characteristic differs from the second illuminating characteristic.

In one aspect, the second illuminating characteristic has a higher intensity and a larger let area compared to the first illuminating characteristic, the second illuminating characteristic being activated when the proximity to the event is larger compared to the proximity associated with the first illuminating characteristic.

In one aspect, the light module includes a plurality of light-emitting diode (LED) components.

The present disclosure also relates to a method for operating a light module of an autonomous vehicle. The method includes identifying a behavior of the light module; and controlling the behavior of the light module to communicate an operating status of an autonomous vehicle based on the identified behavior.

The present disclosure also relates to a system for an autonomous vehicle. The system includes an autonomous driving system; a light module; and a light controller configured to control a behavior of the light module to communicate an operating status of the autonomous vehicle, the operating status being determined based on data from the autonomous driving system.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 4 is a table that shows characteristics of a vehicle light based on the operation status of the vehicle according to one example;

DETAILED DESCRIPTION

Figure 1:
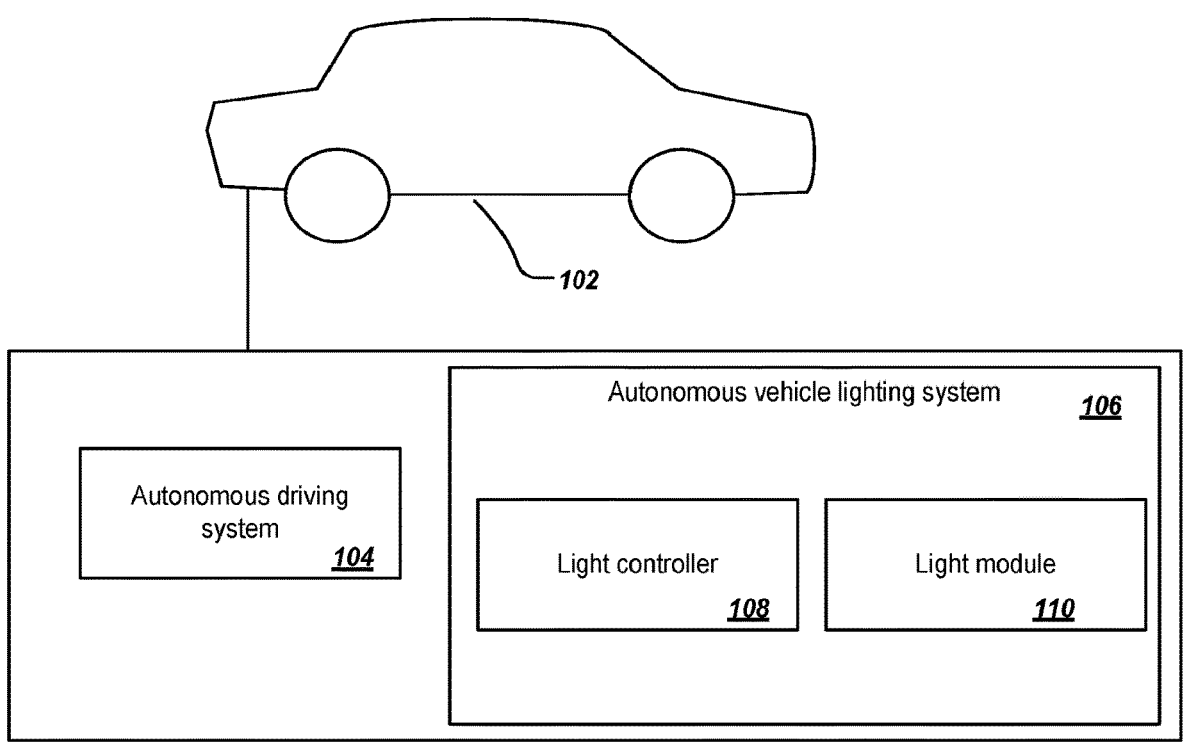
FIG. 1 is a schematic of an autonomous lighting system according to one example.

The following descriptions are meant to further clarify the present disclosure by giving specific examples and embodiments of the disclosure. These embodiments are meant to be illustrative rather than exhaustive. The full scope of the disclosure is not limited to any particular embodiment disclosed in the specification, but rather is defined by the claims.

In the interest of clarity, not all of the features of the implementations described herein are shown and described in detail. It will be appreciated that in the development of any such actual implementation, numerous implementation-specific decisions will be made in order to achieve the developer's specific goals, such as compliance with application- and business-related constraints, and that these specific goals will vary from one implementation to another and from one developer to another.

Referring now to the drawings, wherein like reference numerals designate identical or corresponding parts throughout several views, the following description relates to a vehicle light module and associated methodology for communicating messages and information such as an operating status of a vehicle.

An autonomous vehicle lighting system may communicate an operating status of the vehicle to drivers of other vehicles (e.g., trailing vehicles) and pedestrians. The autonomous vehicle lighting system includes one or more vehicle light modules. The operating status of the vehicle may be communicated by changing the color, intensity, and/or flash rates of the one or more vehicle light modules. This provides the advantage of informing the drivers of other vehicles of the vehicle intent without visual verification of the driver. The autonomous vehicle lighting system may inform vehicles and pedestrians when the autonomous vehicle begin a motion (e.g., taking off, backing up, turning, parking, turning on/off autonomous mode, stopping).

FIG. 1 is a schematic that illustrates the autonomous vehicle lighting system according to one example. The motor vehicle 102 may include an autonomous driving system 104 and an autonomous vehicle lighting system 106. The autonomous vehicle lighting system 106 may include a light controller 108 and a light module 110.

The light module 110 may be one or more light modules 110. The light module 110 may be a part of one or more headlamp assemblies, one or more rear lamp assemblies, or side marker lamps in either or both sides of the motor vehicle 102. In one embodiment, the light module may be placed on top of the vehicle 102. For example, the vehicle 102 may include a single light module placed on top of the vehicle 102 and configured to be 360-degree visible.

The vehicle 102 may be any type of vehicle such as a car, truck, bus, helicopter, or motorcycle. The vehicle 102 may be gas-powered, diesel powered, electric, or solar-powered. The vehicle 102 may be actively operated by a driver or may be partially or completely autonomous or self-driving.

The autonomous driving system 104 may control one or more subsystems of the vehicle 102 (e.g., steering wheel, braking system, accelerator system). The autonomous driving system 104 may send the operating status of the vehicle to the autonomous vehicle lighting system 106. The operating status may include a current and/or future operating status of the vehicle 102. In one example, the autonomous driving system 104 may determine the future operating status based on a planned route of the vehicle 102. For example, the autonomous driving system 104 may output a signal to the light controller 108 indicating a left turn in 20 seconds.

The light controller 108 may receive a command and/or a signal from the autonomous driving system 104. In turn, the light controller 108 may control one or more light modules 110 based on the operating status of the vehicle 102. The light controller 108 may also control the light module 110 based on exterior conditions such as nighttime or daytime in addition to the operating status. For example, the light controller may operate the light module 110 in a "turn" status in response to receiving from the autonomous driving system 104 a signal indicating a left turn in 20 seconds.

Figure 2:
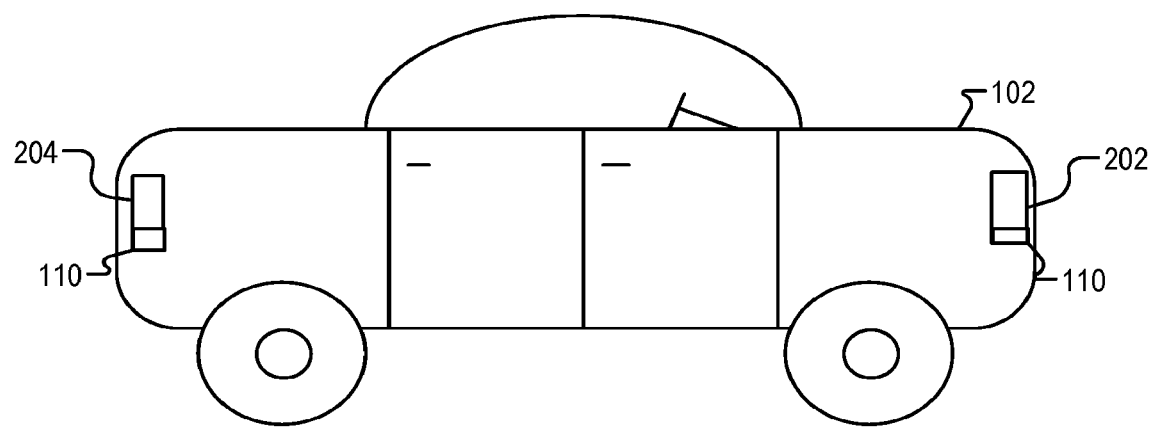
FIG. 2 is a schematic that illustrates a side view of a vehicle according to one example.

FIG. 2 is a schematic that illustrates the motor vehicle 102 according to one example. The motor vehicle 102 may include front lamps 202 (i.e., headlamps) and rear lamps 204 (i.e., tail lamps). The front lamps 202 may include the light module 110. The light module 110 may indicate stop, tail, turn, and marker functions. The light module 110 may also indicate gear state such as park, drive, reverse, or the like.

The front lamp 202 may include low beam headlamps, high beam headlamps, and/or the light module 110. The light module 110 can be separate from the front lamp 202 or it can be incorporated into the same assembly module.

In one embodiment, the vehicle 102 may include four light modules incorporated in a left front lamp, a right front lamp, a left rear lamp, and a right rear lamp.

The light module 110 is operable to illuminate in multiple lighting characteristics (i.e., color, lighting intensity, size, shape) including dynamic and statistic conditions or behavior. The light module 110 may include one or more light sources to provide the desired lighting characteristics associated with multiple operating statuses of the vehicle 102.

The lighting characteristics may include lighting color, lighting intensity, and/or lighting pattern (e.g., flashing rate). For example, the color of the lighting can be selectively varied to indicate the operating status of the vehicle 102. Additionally or alternatively, the size of the lighting (i.e., lit square area), the intensity of the lighting (i.e., luminous intensity), and/or the strobing of the light module (e.g., from slow to quick to steady) may also be varied.

In one example, the lighting characteristic may be a small, low intense flashing green when the autonomous vehicle is occupied. The lighting characteristic to indicate that the autonomous vehicle is from a predetermined period from operation (e.g., 5 seconds, 10 seconds, 15 seconds) may be a large quick flashing high intensity green. The lighting characteristic may be a large steady green when the autonomous vehicle is in traffic.

The lighting characteristic may also include a "normal lighting mode." The lighting characteristic of the "normal lighting mode" may be a small, low intensity, steady green illumination. The light controller 108 may switch to the "normal lighting mode" after a predetermined period from a change of an operating status of the vehicle. For example, the controller 108 may switch to the "normal lighting mode" after one minute from a turn or a merge. In one example, the light controller 108 may revert to previous lighting characteristics after indicating an operating status for a predetermined period. The predetermined period may be predefined and stored in a memory of the autonomous vehicle lighting system 106. For example, the predetermined period for a turn may be 30 seconds. The light controller 108 reverts to the lighting characteristics associated with the previous operating state when the predetermined period elapses. For example, after indicating a turn with a low intensity flashing orange light, the light controller 108 may illuminate the light module with low intensity green to indicate autonomous driving. In another example, lighting characteristics are maintained until receiving a subsequent operating state from the autonomous driving system 104. For example, the end of a turn may be detected via a steering wheel, a status of the wheels of the vehicle, or from the operation data of the autonomous driving system 104.

The one or more light sources may include, but are not limited to, incandescent lamps, fluorescent lamps, neon lamps, light emitting diodes (LEDs), polymer light emitting diodes (PLEDs), monolithic light-emitting diodes (MLEDs), and electroluminescent lamps (e.g., organic and inorganic).

In one embodiment, the light module 110 may include one or more optical fiber panels.

In one embodiment, the light module 110 may include one or more LEDs. The light controller 108 may selectively illuminate the one or more LEDs. The LEDs may be equipped with multiple diodes with different semiconductor materials to emit multiple colors, either separately or simultaneously. For example, the LEDs may emit red, green, or blue light. The light module 110 may be connected to a power system of the vehicle (e.g., 12-Volt DC battery).

In one embodiment, the lighting characteristics of an operating status may change during daytime hours versus during night time hours as described previously herein. For example the lighting characteristic of the operating status of the operating status of the vehicle may include a predetermined color or colors that are fit for daytime. In another example, the intensity of the illumination may be varied during daytime hours versus during night time hours.

Figure 3:
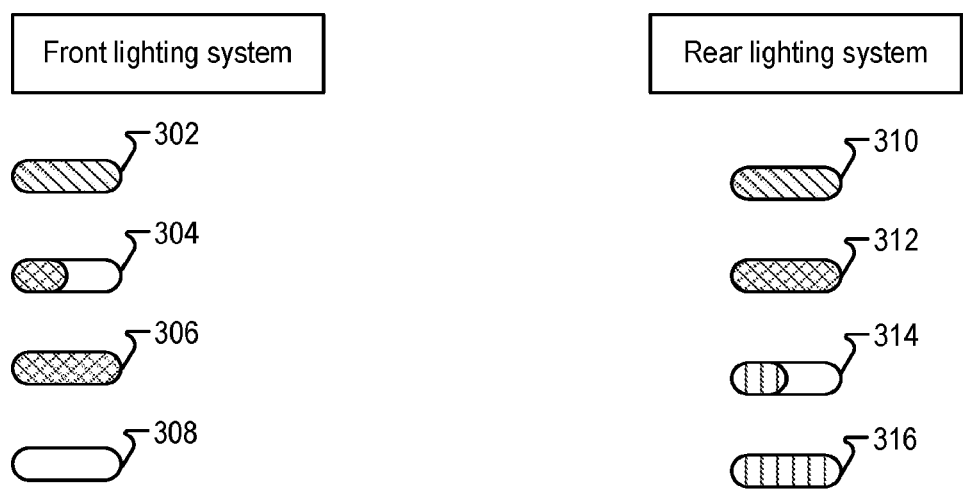
FIG. 3 is a schematic that illustrates exemplary operation status indicators according to one example.

FIG. 3 is a schematic that shows various states of the front lamps 202 and the rear lamps 204 according to one example. The front lamps 202 may operate in multiple states to inform drivers and pedestrians of various operating states of the vehicle. Each state may be associated with a use case or function of the vehicle 102 (i.e., turn, autonomous driving, tail, stop). Each state may include one or more characteristic attributes such as color, flash, and the like as described previously herein.

For example, a first state 302 may be associated with autonomous driving. The first state 302 may be green. The light module 110 may turn green. For example, the light controller 108 may activate the green light emitting LEDs of the light module 110. A second state 304 may be associated with daytime. The second state 304 may be a small lit area illuminated with an orange light. A third state 306 may be orange to indicate a turn. A fourth state 308 may be white to indicate autonomous driving at nighttime. For the rear lighting system, a first state 310 may indicate autonomous driving, a second state 312 may indicate a turn, a third state 314 may be used for nighttime tail, and a fourth state 316 may indicate a nighttime stop. The first state 310 may be solid green. The second state 312 may be orange. The third state 314 may be a small red lit area. The fourth state may be red. Pedestrians and drivers of other vehicles need to have an accepted meaning associated with each message or status of the light module. Green emitting lamps are not known or used currently in non-autonomous vehicle but a green light or a flashing green light may be easily understood by other drivers and pedestrians as an indication of a moving object or that the object may be moving soon.

FIG. 4 is a schematic that shows an exemplary table 400 for the autonomous lighting system according to one example. Table 400 shows lighting characteristics for various use cases.

For each use case, aspect of the vehicle module may be changed by varying the color, intensity, shape, and/or flash rate. In one example, to indicate that the vehicle is operating in an autonomous mode a green light may be used. A small green light may be used when the vehicle is an autonomous mode and parked. When the vehicle start moving, the size of the light may be increased. Additionally and or alternatively, the intensity and the flash rate may be increased to alert other vehicles and pedestrians.

In one example, the intensity, size, and flash rate may be changed to indicate a turn. The light module may be activated in a first state to indicate a turn in the future. Then, the characteristics are changed to a second state when the vehicle is about to perform the function (e.g., turn). For example, as the vehicle is getting closer to turn the lighting may get brighter, bigger, and/or flash quicker.

In one embodiment, the characteristics to indicate an operating status may be based on the location of the surrounding vehicles/pedestrians. For example, the characteristics of the light to indicate a stop may vary based on a distance between the autonomous vehicle and another vehicle (e.g., tailing vehicle). As the distance between the vehicle and the tailing vehicle decreases, the let area of the vehicle light may increase. In other examples, the let area, the intensity, and/or the flash rate may be increased. Further, the characteristics may indicate a hard brake (quick stop).

In one embodiment, a green light may be used to indicate an autonomous mode of the vehicle. Flashing mode may be used for alerts. In addition, shape of the light/illumination may be used to indicate proximity of an event (e.g., stop, turn). In other words, different shapes/illumination may be used to differentiate between a turn to be performed after 30 seconds or 1 minute.

As described previously herein, the vehicle may include one or more sensors. The sensors may send control signals to the light controller 108. The sensor may include a global positioning system, a camera, a near infrared sensor, and the like. The sensors may be used to determine the operating status of the vehicle and the position of surrounding vehicles.

Figure 5:
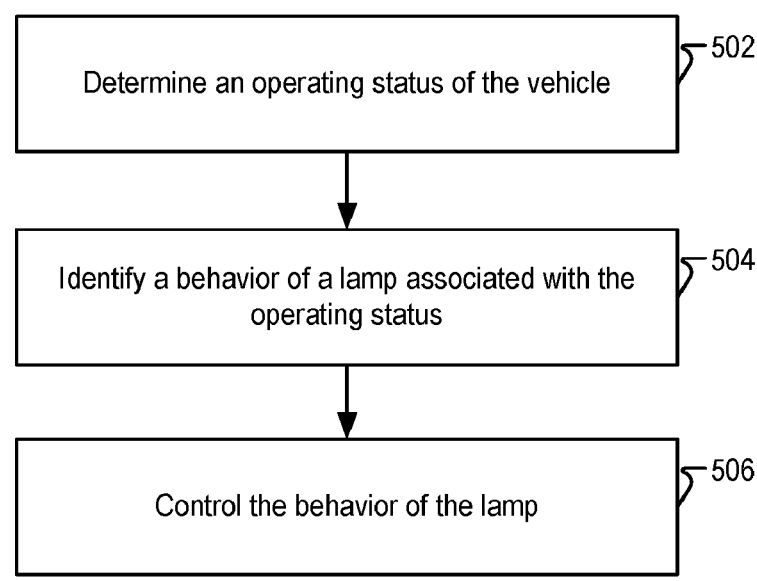
FIG. 5 is a flowchart of a method for the autonomous lighting system according to one example.

FIG. 5 is a flowchart for an exemplary method 500 of providing information in an autonomous vehicle according to one example. At step 502, the operating status of the vehicle is determined. The light controller 108 may retrieve the operating status from the autonomous driving system 104. In other embodiments, the autonomous driving system 104 may send a signal to the light controller 108 indicating the operating status of the vehicle 102. In one example, the autonomous driving system 104 may output the signal at predetermined instances or when there is a change in the operating status of the vehicle 102. In one example, the light controller 108 may poll the autonomous driving system 104 at predetermined instances to determine the operating status of the vehicle 102.

At step 504, the light controller 108 may identify a behavior of the light module/lamp associated with the operating status of the vehicle 102. The light controller 108 may identify the behavior by referencing a look-up table stored in a memory. The look-up table may also be stored in a cloud based database. The look-up table may store an association between the operating status and the behavior of the one or more light modules 110. In other words, the look-up table may store for each light module and each use case whether the lighting characteristics are to be varied and the new lighting characteristics. For example, the look-up table may store the behavior of the rear right lamp, rear left lamp, front right lamp, and front left lamp to indicate autonomous driving during daytime. In one embodiment, the lighting characteristics may be based on regulatory standards. Further, the behavior may be identified and/or modified based on a user input. For example, the user input may identify a theme for the behavior of the light module during autonomous operation of the vehicle.

At step 506, the light controller 108 may control the behavior of the light module 110 based on the identified behavior at step 504. For example, the light controller 108 may change one or more light characteristics of the light module 110.

Embodiments described herein provide many advantages. Embodiments described herein for the light module provide information to drivers and pedestrians thus increasing safety.

Figure 6:
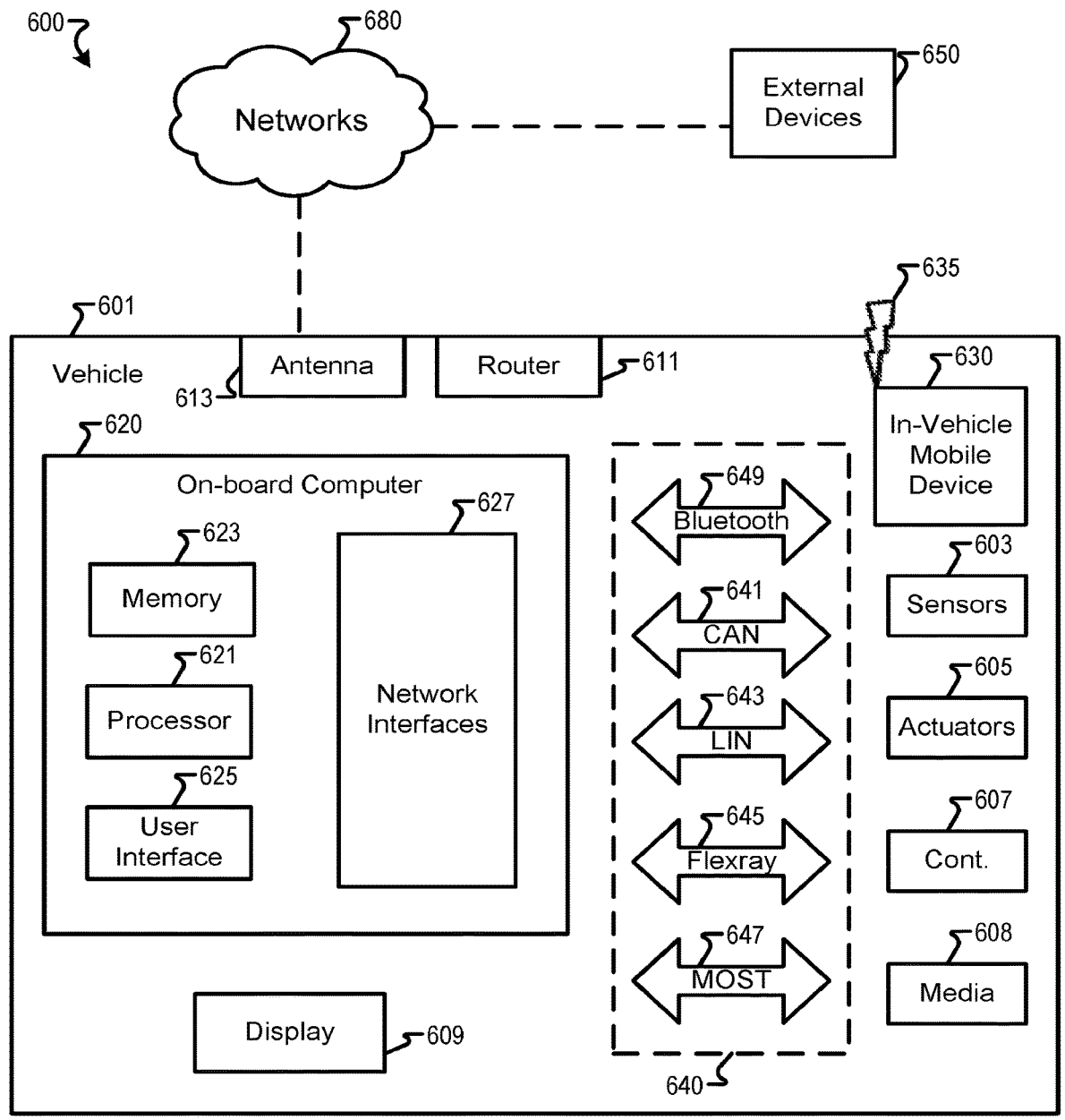
FIG. 6 is a simplified block diagram of a vehicle environment according to one example.

FIG. 6 is a simplified block diagram of a vehicle environment 600 in which embodiments of the invention disclosed herein may be implemented. The vehicle environment 600 includes a vehicle 601 in communication with one or more external devices 650 by way of one or more external networks 680. Vehicle 601 also includes various internal networks 640 for interconnecting several vehicle devices within the vehicle as will be discussed below. The vehicle environment 600 may also include one or more in-vehicle mobile device 630. External devices 650 include any device located outside the vehicle 601 such that the external device must communicate with the vehicle and its devices by an external network 680. For example, the external devices may include mobile devices, electronic devices in networked systems (e.g., servers or clients in a local area network (LAN), etc.), on board computers of other vehicles etc. In-vehicle mobile devices 630 are devices which are located within, or in the vicinity of the vehicle 601 such that the in-vehicle mobile device can communicate directly with internal networks 640 of the vehicle 601. In-vehicle mobile devices 630 may also connect with external networks 680 as discussed below.

Vehicle 601 includes vehicle devices integral with or otherwise associated with the vehicle 601. In the embodiment of FIG. 6, vehicle devices include one or more sensors 603, one or more actuators 605, one or more control units 607, one or more media systems 608, one or more displays 609, one or more routers 611, one or more antenna 613, and one or more on board computers 620. The one or more on board computers 620 may correspond to the control module. As used herein, the term "vehicle device" is meant to encompass sensors, actuators, controllers, electronic control units (ECUs), detectors, instruments, embedded devices, media devices including speakers, a CD and/or DVD player, a radio, etc, vehicle navigation systems (e.g., GPS) displays, other peripheral or auxiliary devices or components associated with the vehicle 601.

Sensors 603 detect various conditions within (or in the immediate vicinity of) the vehicle 601. For example, sensors 603 may be temperature sensors, photosensors, position sensors, speed sensors, angle sensors or any other sensor for detecting a diagnostic condition or other parameter of the vehicle 601 or its ambient environment. Sensors 603 may be passive or "dumb" sensors that provide an analog representative of the sensed parameter, or so called "smart" sensors with integrated memory and digital processing capability to analyze the parameter sensed within the sensor itself. Actuators 605 cause motion of some mechanical element of the vehicle in response to a control signal. For example, actuators 605 may be hydraulic actuators, pneumatic actuators or electrical/electronic actuators such as a stepper motor. Actuators 605 may be used to move vehicle lighting devices to implement intelligent light, for example. Actuators 605 may be used to move the vehicle light module 110.

Actuators 605 may also be "dumb" devices that react to a simple analog voltage input, or "smart" devices with built-in memory and processing capability. Actuators 605 may be activated based on a sensed parameter from sensors 603, and one such sensed parameter may be a physical position of the actuator 603 itself. Thus, the sensors 603 and actuators 605 may be connected in a feedback control loop for diagnostic detection and control of the vehicle 601.

Control units 607 include any embedded system, processor, electronic control unit (ECU) or microcontroller. Control unit 607 may be dedicated to a specific region or function of the vehicle 601. For example, control unit 607 can provide memory and control logic functions for several dumb devices, such as passive sensors 603 and actuators 605. In one embodiment, control unit 607 is an ECU dedicated for controlling one or more lighting devices, for example vehicle light module 110, according to embodiments disclosed herein. Typically, numerous ECUs, with different embedded software, may be found in a single automobile and may communicate via internal networks as discussed below.

On-board computer 620 is a vehicle device for providing general purpose computing functionality within the vehicle 601. The on-board computer 620 typically handles computationally intensive functions based on software applications or "apps" loaded into memory. On-board computer 620 may also provide a common interface for different communication networks in the vehicle environment 600. On-board computer 620 includes one or more processor 621, one or more memory 623, one or more user interface 625 (e.g., the operator interface described previously herein), and one or more network interface 627. One or more display 609 and one or more router 611 may be an integral part of the on board computer 610, or distributed in the vehicle and associated with the on-board computer and other vehicle devices. Separate displays 609 may be provided in suitable locations for access by a driver and passengers in the vehicle 601.

On-board computer 620, and other associated or integrated components such as vehicle devices can include one or more memory element 623 for storing information to be used in achieving operations associated with control of one or more vehicle lights as disclosed herein. Further, these devices may keep information in any suitable memory element (e.g., random access memory (RAM), read only memory (ROM), field programmable gate array (FPGA), erasable programmable read only memory (EPROM), electrically erasable programmable ROM (EEPROM), etc.), software, hardware, or in any other suitable component, device, element, or object where appropriate and based on particular needs. The information being tracked, sent, received, or stored in vehicle environment 600 could be provided in any database, register, table, cache, queue, control list, or storage structure, based on particular needs and implementations, all of which could be referenced in any suitable timeframe.

In example embodiments, the operations for controlling the vehicle light module 110 may be implemented by logic encoded in one or more tangible media, which may be inclusive of non-transitory media (e.g., embedded logic provided in an ASIC, digital signal processor (DSP) instructions, software potentially inclusive of object code and source code to be executed by a processor or other similar vehicle device, etc.). In some of these instances, one or more memory elements (e.g., memory 623) can store data used for the operations described herein. This includes the memory elements being able to store software, logic, code, or processor instructions that are executed to carry out the activities described in this Specification.

Processor 621 can execute software or algorithms to perform activities to enable control of lighting devices disclosed herein. A processor 621 can execute any type of instructions associated with the data to achieve the operations detailed herein. In one example, the activities outlined herein may be implemented with fixed logic or programmable logic (e.g., software/computer instructions executed by a processor) and the elements identified herein could be some type of a programmable processor, programmable digital logic (e.g., an FPGA, an EPROM, an EEPROM), or an ASIC that includes digital logic, software, code, electronic instructions, flash memory, optical disks, CD-ROMs, DVD ROMs, magnetic or optical cards, other types of computer-readable mediums suitable for storing electronic instructions. Any of the potential processing elements, modules, microprocessors, digital signal processors (DSPs), and other devices described herein should be construed as being encompassed within the broad term 'processor.'

Elements of FIG. 6 may be communicatively coupled to one another by one or more suitable communications medium (e.g., wired, wireless, optical) that provides a pathway for electronic communications. Any element in FIG. 6 may act as a network node in communication with any other element of FIG. 6 also acting as a network node. Any suitable network messaging protocol, network topology or network geographic scope may be included in the vehicle environment 600. Thus, embodiments of on-board computer 620 may include one or more distinct interfaces, represented by network interfaces 627, to facilitate communication via the various networks (including both internal and external networks) described herein. Such network interfaces 627 may be inclusive of multiple wireless interfaces (e.g., WiFi, WiMax, 3G, 4G, white space, 802.11x, satellite, Bluetooth, LTE, GSM/HSPA, CDMA/EVDO, DSRC, CAN, GPS, etc.). Other interfaces represented by network interfaces 627, may include physical ports (e.g., Ethernet, USB, HDMI, etc.), interfaces for wired and wireless internal subsystems, and the like. Similarly, each of the nodes of vehicle environment 600 can also include suitable interfaces for receiving, transmitting, and/or otherwise communicating data or information in the vehicle environment 600.

Multiple internal vehicle networks represented by 640 may exist in the vehicle 601 to provide communication pathways to various vehicle devices distributed throughout the vehicle 601. An internal vehicle network 640 is a collection of nodes, such as vehicle devices, integrated with or otherwise linked to the vehicle and interconnected by communication means. Vehicle networks 640 typically include hard wired bus type networks, each providing communication pathways to particular vehicle devices distributed throughout a vehicle. FIG. 6 shows four examples of such hard wired networks: Controller Area Network (CAN) 641, Local Internet Network (LIN) 643, Flexray bus 645, and Media Oriented System Transport (MOST) network 647.

CAN bus 641 uses a message based protocol, designed for and typically used by automotive applications. The CAN bus 641 is a vehicle bus standard designed to allow microcontrollers, sensors, and other devices to communicate with each other via the CAN without a host computer. CAN protocol may be used for soft real-time control of devices such as a vehicle antilock braking system. For example, CAN bus 641 may connect a transmission sensor and an energy sensor to a main engine controller, and a different CAN bus may connect the main engine controller and a main body controller to on-board computer 620. LIN network 643 may be used to sense external conditions such as light, or to control small mechanisms such as door locking systems. For example, LIN bus 643 may connect a driver's seat actuator, temperature controls, and windshield wiper actuators to a main body controller of a CAN bus.

Flexray bus 645 is typically a dedicated network for hard real-time controllers, used for drive-by-wire and/or brake-by-wire applications in which information from the engine and/or wheels of the vehicle 601 is collected and transmitted to appropriate applications and/or data repositories. For example, Flexray bus 645 may connect a chassis module of the vehicle 601 to on-board computer 620 through an appropriate interface, and/or may connect brakes and electronic stability control (ESB) to the chassis module attached to Flexray 645. MOST network 647 can also be found in vehicles for transmitting audio, video, and voice on fiber optics. MOST buses 647 can connect media system 608, to on-board computer 620 through appropriate interfaces, and/or connect a reversing camera and a navigation system to an intermediate device which is connected to computer by MOST bus 647 such as the light controller 108.

Other hard wired internal networks such as Ethernet may be used to interconnect vehicle devices in the vehicle 601. Further, internal wireless networks 649, such as near field communications, Bluetooth, etc. may interconnect vehicle devices.

External networks 680 may be accessed from vehicle 601 by vehicle devices and in-vehicle mobile devices 630 when a communication link 635 is available. In-vehicle mobile devices 630 include mobile phones, smart mobile phones (smartphones), e-book readers, tablets, iPads, personal digital assistants (PDAs), laptops or electronic notebooks, portable navigation systems, multimedia gadgets (e.g., cameras, video and/or audio players, etc.), gaming systems, other handheld electronic devices, and any other device, component, element, or object capable of initiating voice, audio, video, media, or data exchanges within vehicle environment 600. Data may be any type of numeric, voice, video, or script data, or any type of source or object code, or any other suitable information in any appropriate format that may be communicated from one point to another in electronic devices and/or networks. A vehicle router 611 may also be used to access external network infrastructure within range of the antenna 613 of vehicle 601.

Some form of wireless communication is needed to achieve external network connectivity from vehicle 601. For example third generation (3G), fourth generation (4G), and 3GPP long term evolution (LTE) wireless telephone technologies, worldwide interoperability for microwave access (WiMax), WiFi, and dedicated short-range communications (DSRC) are some of the numerous wireless technologies currently available with the appropriate interfaces and network infrastructure to support the technology.

Users (driver or passenger) may initiate communication in vehicle environment 600 via some network, and such communication may be initiated through any suitable device such as, in-vehicle mobile device 630, display 609, user interface 625, or external devices 650, for example to activate a mode of operation of the vehicle light module 110.

In-vehicle mobile devices 630, and mobile devices external to vehicle 601, may communicate with on-board computer 620 through any wireless or wired communication link and may be configured as a personal area network (PAN) or a wireless personal area network (WPAN) or any other appropriate networking architecture or system that facilitates communications in a network environment. Wired and wireless communication links may any electronic link such as Bluetooth, wireless technologies (e.g., IEEE 802.11x), a USB cable, an HDMI cable, etc. In one example, an external mobile device may be connected to computer 620 through a USB cable or wireless network when, for example, the external mobile device is a diagnostic tool used by a mechanic for servicing vehicle 601.

While certain embodiments have been described herein, these embodiments are presented by way of example only, and are not intended to limit the scope of the disclosure. Using the teachings in this disclosure, a person having ordinary skill in the art can modify and adapt the disclosure in various ways, making omissions, substitutions, and/or changes in the form of the embodiments described herein, without departing from the spirit of the disclosure. Moreover, in interpreting the disclosure, all terms should be interpreted in the broadest possible manner consistent with the context. The accompanying claims and their equivalents are intended to cover such forms or modifications, as would fall within the scope and spirit of the disclosure.

The invention claimed is:

1. A vehicle lighting system, comprising:
a light module; and
a controller configured to control a behavior of the light module to communicate an operating status of an autonomous vehicle,
wherein the controller is configured to control the light module to be a first color for a first operating status and control the light module to be a second color for a second operating status,
wherein a first illuminating characteristic and a second illuminating characteristic are associated with the same operating status of the autonomous vehicle,
wherein a selection between the first illuminating characteristic and the second illuminating characteristic is based on a proximity of an event or a proximity of another vehicle to the autonomous vehicle,
wherein the first illuminating characteristic differs from the second illuminating characteristic in at least one of intensity, size, or flash rate,
wherein the light module is provided in a headlamp or a tail lamp of the autonomous vehicle, and
wherein the second illuminating characteristic having a higher intensity and a larger let area compared to the first illuminating characteristic, the second illuminating characteristic being activated when the proximity to the event is larger compared to the proximity associated with the first illuminating characteristic.

2. The vehicle lighting system of claim 1, wherein the controller is further configured to:
determine the operating status of the autonomous vehicle;
identify the behavior of the light module associated with the operating status; and
control the behavior of the light module based on the identified behavior.

3. The vehicle lighting system of claim 1, wherein the behavior includes one or more of a color, an intensity, and a pattern of illumination.

4. The vehicle lighting system of claim 1, further comprising:
a sensor configured to determine the operating status of the autonomous vehicle.

5. The vehicle lighting system of claim 4, wherein the sensor includes a global positioning system.

6. The vehicle lighting system of claim 4, wherein the sensor includes a camera.

7. The vehicle lighting system of claim 1, wherein the behavior is identified based on a user input.

8. The vehicle lighting system of claim 1, wherein the behavior of the light module is based on a regulatory standard.

9. A vehicle lighting system comprising:
a light module; and
a controller configured to control a behavior of the light module to communicate an operating status of an autonomous vehicle wherein a first illuminating characteristic and a second illuminating characteristic are associated with the operating status of the autonomous vehicle, and a selection between the first illuminating characteristic and the second illuminating characteristic is based on a proximity of an event or a proximity of another vehicle to the autonomous vehicle, the second illuminating characteristic having a higher intensity and a larger let area compared to the first illuminating characteristic, the second illuminating characteristic being activated when the proximity to the event is larger compared to the proximity associated with the first illuminating characteristic.

10. The vehicle lighting system of claim 1, wherein the light module includes a plurality of light-emitting diode (LED) components.

11. A method for operating a light module of an autonomous vehicle, the method comprising:
identifying a behavior of the light module; and
controlling the behavior of the light module to communicate an operating status of an autonomous vehicle based on the identified behavior,
wherein the light module is a first color for a first operating status and the light module is a second color for a second operating status,
wherein a first illuminating characteristic and a second illuminating characteristic are associated with the same operating status of the autonomous vehicle,
wherein a selection between the first illuminating characteristic and the second illuminating characteristic is based on a proximity of an event or a proximity of another vehicle to the autonomous vehicle,
wherein the first illuminating characteristic differs from the second illuminating characteristic in at least one of intensity, size, or flash rate,
wherein the light module is provided in a headlamp or a tail lamp of the autonomous vehicle, and
wherein the second illuminating characteristic having a higher intensity and a larger let area compared to the first illuminating characteristic, the second illuminating characteristic being activated when the proximity to the event is larger compared to the proximity associated with the first illuminating characteristic.

12. The method of claim 11, further comprising:
determining the operating status of the autonomous vehicle;
identify the behavior of the light module associated with the operating status; and
controlling the behavior of the light module based on the identified behavior.

13. The method of claim 12, wherein the behavior of the light module associated with the operating status differs between daytime and nighttime operation of the autonomous vehicle.

14. The method of claim 11, wherein the behavior is based on a current operation status of the autonomous vehicle or a future operating status of the vehicle.

* * * * *